US010065354B2

(12) United States Patent
O'Neil (10) Patent No.: US 10,065,354 B2
(45) Date of Patent: Sep. 4, 2018

(54) 3D PRINTER SYSTEM WITH CIRCULAR CAROUSEL AND MULTIPLE MATERIAL DELIVERY SYSTEMS

(71) Applicant: 3D Total Solutions, Inc., Ridgefield, CT (US)

(72) Inventor: Patrick J. O'Neil, Ridgefield, CT (US)

(73) Assignee: 3D TOTAL SOLUTIONS, INC., Ridgefield, CT (US)

( * ) Notice: Subject to any disclaimer, the term of this patent is extended or adjusted under 35 U.S.C. 154(b) by 513 days.

(21) Appl. No.: 14/679,632

(22) Filed: Apr. 6, 2015

(65) Prior Publication Data

US 2015/0283751 A1  Oct. 8, 2015

Related U.S. Application Data

(60) Provisional application No. 61/976,137, filed on Apr. 7, 2014.

(51) Int. Cl.
*B29C 47/00* (2006.01)
*B29C 67/00* (2017.01)
(Continued)

(52) U.S. Cl.
CPC .......... *B29C 47/043* (2013.01); *B22D 23/003* (2013.01); *B29C 47/0002* (2013.01); *B29C 47/0004* (2013.01); *B29C 47/084* (2013.01); *B29C 47/0806* (2013.01); *B29C 47/0813* (2013.01); *B29C 47/0864* (2013.01); (Continued)

(58) Field of Classification Search
CPC ............ B29C 47/0002; B29C 47/0806; B29C 47/0813; B29C 47/1009; B29C 47/1027; B29C 47/862; B29C 47/864; B29C 64/00; B29C 64/20; B29C 64/209; B29C 64/227; B29C 64/232; B29C 64/236; B29C 64/245; B29C 64/295; B29C 64/336;
(Continued)

(56) References Cited

U.S. PATENT DOCUMENTS

| 8,827,684 B1* | 9/2014 | Schumacher ....... B29C 67/0085 264/308 |
| 2008/0317894 A1* | 12/2008 | Turley ................ B29C 47/0877 425/226 |

(Continued)

*Primary Examiner* — Alison L Hindenlang
*Assistant Examiner* — Joseph S Leyson
(74) *Attorney, Agent, or Firm* — Jonathan A. Tyler (57) ABSTRACT

A carousel system includes a platform and a plurality of material delivery systems mounted on a periphery of the platform, each respective material delivery system including a first gear and an extruder nozzle head. The carousel system also includes a carousel rotatably mounted on the platform, a first motor adapted to cause the carousel to rotate from a first radial position to a second radial position, a second motor mounted on the carousel, a drive shaft coupled to the second motor, and a second gear coupled to the drive shaft. Engagement of the second gear with one of the first gears causes the corresponding material delivery system to force an amount of a selected material into the corresponding extruder nozzle head, heat the selected material to soften the selected material, and deposit the selected material on a surface. Each material delivery system provides material having a respective color. The carousel system may be used in a 3D printing system.

9 Claims, 12 Drawing Sheets

(51) Int. Cl.
*B29C 47/04* (2006.01)
*B22D 23/00* (2006.01)
*B29C 64/245* (2017.01)
*B29C 64/227* (2017.01)
*B29C 47/86* (2006.01)
*B29C 64/35* (2017.01)
*B29C 64/295* (2017.01)
*B29C 47/10* (2006.01)
*B29C 47/08* (2006.01)
*B29C 64/232* (2017.01)
*B29C 64/336* (2017.01)
*B29C 64/236* (2017.01)
*B29C 64/209* (2017.01)
*B29C 64/343* (2017.01)
*B29C 47/92* (2006.01)
*B33Y 30/00* (2015.01)
*B33Y 10/00* (2015.01)
*B29K 101/12* (2006.01)
*B33Y 40/00* (2015.01)
*B29K 67/00* (2006.01)

(52) U.S. Cl.
CPC ...... *B29C 47/0866* (2013.01); *B29C 47/1009* (2013.01); *B29C 47/1027* (2013.01); *B29C 47/862* (2013.01); *B29C 47/864* (2013.01); *B29C 47/92* (2013.01); *B29C 64/209* (2017.08); *B29C 64/227* (2017.08); *B29C 64/232* (2017.08); *B29C 64/236* (2017.08); *B29C 64/245* (2017.08); *B29C 64/295* (2017.08); *B29C 64/336* (2017.08); *B29C 64/343* (2017.08); *B29C 64/35* (2017.08); *B29C 67/0055* (2013.01); *B29C 67/0085* (2013.01); *B29K 2067/046* (2013.01); *B29K 2101/12* (2013.01); *B33Y 10/00* (2014.12); *B33Y 30/00* (2014.12); *B33Y 40/00* (2014.12)

(58) Field of Classification Search
CPC ....... B29C 64/343; B29C 64/35; B33Y 30/00; B33Y 40/00; B33Y 70/00
See application file for complete search history.

(56) References Cited

U.S. PATENT DOCUMENTS

2016/0059492 A1* 3/2016 Lee ............... B29C 67/0088 425/145
2016/0176120 A1* 6/2016 Skubic ............ B29C 67/0096 425/376.1
2016/0339542 A1* 11/2016 Paetz ............... G03G 15/224

* cited by examiner

FIG. 11

3D PRINTER SYSTEM WITH CIRCULAR CAROUSEL AND MULTIPLE MATERIAL DELIVERY SYSTEMS

PRIORITY APPLICATION

This application claims the benefit of U.S. Provisional Patent Application No. 61/976,137, filed on Apr. 7, 2014, which is incorporated by reference herein in its entirety for all purposes.

TECHNICAL FIELD

This specification relates generally to 3D printer systems and more particularly, to a 3D printer system with a circular carousel and multiple material delivery systems.

BACKGROUND

The 3D printer industry has experienced significant growth in recent years. Much of this growth is due to improvements in 3D printing technology that have made possible the construction of 3D printers that are sufficiently small and inexpensive to be offered to the general consumer.

To perform a print, a 3D printer machine typically obtains a design of a CAD model from a 3D printable file (STL file) and applies an additive process by laying down successive layers of liquid, powder, paper or sheet material to build the model from a series of cross sections. These layers, which correspond to the virtual cross sections from the CAD model, are joined or automatically fused to create the final shape.

While traditional techniques such as injection molding can be less expensive for manufacturing polymer products in high quantities, additive manufacturing techniques used in 3D printing can be faster, more flexible and less expensive when producing relatively small quantities of parts.

In one 3D printing method known as fused deposition modeling, the desired model, part, or object is produced by extruding small amounts of material which harden immediately to form layers. Typically, a thermoplastic filament or metal wire is unreeled from a coil to supply material to an extrusion nozzle head. The nozzle head heats the material and turns the flow on and off. The extrusion nozzle head is mounted above a bed on which layers of the material are deposited and a desired object is built. Typically stepper motors or servo motors are employed to move the extrusion head and adjust the flow; the head can typically be moved in both horizontal and vertical directions. Control of this mechanism is typically done by a computer-aided manufacturing (CAM) software package running on a microcontroller.

Various polymers may be used, including acrylonitrile butadiene styrene (ABS), polycarbonate (PC), polylactic acid (PLA), high density polyethylene (HDPE), etc.

Generally, a single extrusion nozzle head holds a single filament and therefore delivers a single color of the material. Many 3D printers include a single extrusion head and therefore offer a single color. Some existing 3D printers include two or three extrusion nozzle heads and therefore can offer two or three colors. Typically, the extrusion nozzle heads are mounted on a linear structure that moves back and forth above the bed on which the desired object is built.

SUMMARY

In accordance with an embodiment, a carousel system includes a platform, and a plurality of material delivery systems mounted on a periphery of the platform, each respective material delivery system including a first gear and an extruder nozzle head. The carousel system also includes a carousel rotatably mounted on the platform, a first motor adapted to cause the carousel to rotate from a first radial position to a second radial position, a second motor mounted on the carousel, a drive shaft coupled to the second motor, and a second gear coupled to the drive shaft, the second gear adapted to engage with a selected one of the first gears. Engagement of the second gear with a selected one of the first gears causes the corresponding material delivery system to force an amount of a selected material into the corresponding extruder nozzle head, heat the amount of the selected material within the extruder nozzle head to soften the selected material, and deposit the amount of the selected material on a surface.

In one embodiment, the carousel has a circular shape. In other embodiments, the plurality of material delivery systems includes two, three, four, five, six, or more material delivery systems, each material delivery system being associated with a respective material having a respective color. The material delivery systems may be mounted symmetrically around the periphery of the platform.

In another embodiment, a 3D printer system including the carousel system described herein is provided.

In another embodiment, the selected material may include a thermoplastic filament or a metal wire.

In another embodiment, a 3D printer system includes a track system, and a rack mounted on the track system, the rack being capable of movement with at least one degree of freedom within the track system. The 3D printer system also includes a bed adapted to receive at least a first layer of a selected material and a second layer of a second material, and a drip surface proximate the bed. A carousel system similar to the carousel system described herein is mounted on the rack. The bed is further adapted to move to a lower position after the selected material is deposited on the bed, such that a first surface of the selected material is level with a second surface of the drip surface. The carousel system is further adapted to move from a first position above the bed to a second position above the drip surface, and to move above the drip surface in a manner that causes the selected material to be wiped from the extruder nozzle head onto the drip surface.

In another embodiment, the drip surface includes a cavity, a sidewall having a first height lower than a second height of the second surface, and a lip joined to the second surface and protruding horizontally over the cavity.

In accordance with another embodiment, a method of operating a circular carousel system is provided. A desired color is selected from among a plurality of colors available in a 3D printer system. A material delivery system associated with a material of a desired color is selected, from among a plurality of material delivery systems in the 3D printer system, wherein the plurality of material delivery systems are distributed at a periphery of a circle defined concentrically with a circular carousel carrying a drive motor. The circular carousel is rotated through a selected radial displacement to cause a first gear coupled to the drive motor to engage with a second gear associated with the selected material delivery system, wherein the selected material delivery system comprises an extruder element and an extruder nozzle head, wherein engagement of the first gear with the second gear causes a filament of a material of the desired color to be heated within the extruder nozzle head and deposited on a surface.

In another embodiment, the surface is lowered to cause a second surface of the material deposited on the surface to be level with a drip surface proximate the surface. The material delivery system is moved from a first position above the surface to a second position above the drip surface. The material delivery system is moved above the drip surface in a manner that causes the material to be wiped from the extruder nozzle head onto the drip surface.

In accordance with another embodiment, a 3D printer system includes a track system, a rack mounted on the track system, the rack being adapted to move with at least one degree of freedom within the track system, a bed having a first surface, a material delivery system mounted on the rack, the material delivery system comprising at least one extruder nozzle adapted to deposit a material on the first surface, and a drip surface proximate the bed, the drip surface having a second surface. The bed is adapted to move to a lower position after the material is deposited on the bed, such that a third surface of the material is level with the second surface of the drip surface. The material delivery system is adapted to move from a first position above the bed to a second position above the drip surface, and to move above the drip surface in a manner that causes material to be wiped off the extruder nozzle head onto the drip surface.

In accordance with another embodiment, a method of pre-heating an extruder nozzle head is provided. A first extruder nozzle head is used to deposit material of a first color. A second extruder nozzle head associated with a material of a second color that will be deposited subsequent to the first material of the first color is identified. The second extruder nozzle head is pre-heated to a selected temperature prior to use in order to pre-heat the material of the second color. The second extruder nozzle head is used to deposit material of the second color.

These and other advantages of the present disclosure will be apparent to those of ordinary skill in the art by reference to the following Detailed Description and the accompanying drawings.

DETAILED DESCRIPTION

In accordance with an embodiment, a 3D printer system comprising a circular carousel system is provided. The circular carousel comprises a platform and two or more material delivery systems arranged around the periphery of the platform. Each material delivery system comprises a tensioner, an extruder, an extruder nozzle head, and an activation gear. Each material delivery system is adapted to pull a filament of a selected material from a filament source and to force the filament into the extruder and nozzle head, when the activation gear is rotated.

The carousel system also comprises a circular carousel rotatably mounted on the platform. A drive motor is mounted on the carousel. The drive motor includes a drive shaft and a drive gear. The drive gear is adapted to engage with the activation gear of a selected one of the delivery systems.

The carousel system further includes a carousel motor adapted to rotate the circular carousel and cause the drive gear to engage with the activation gear of a selected one of the material delivery systems. The carousel motor may be controlled by a computer, for example.

Figure 1:
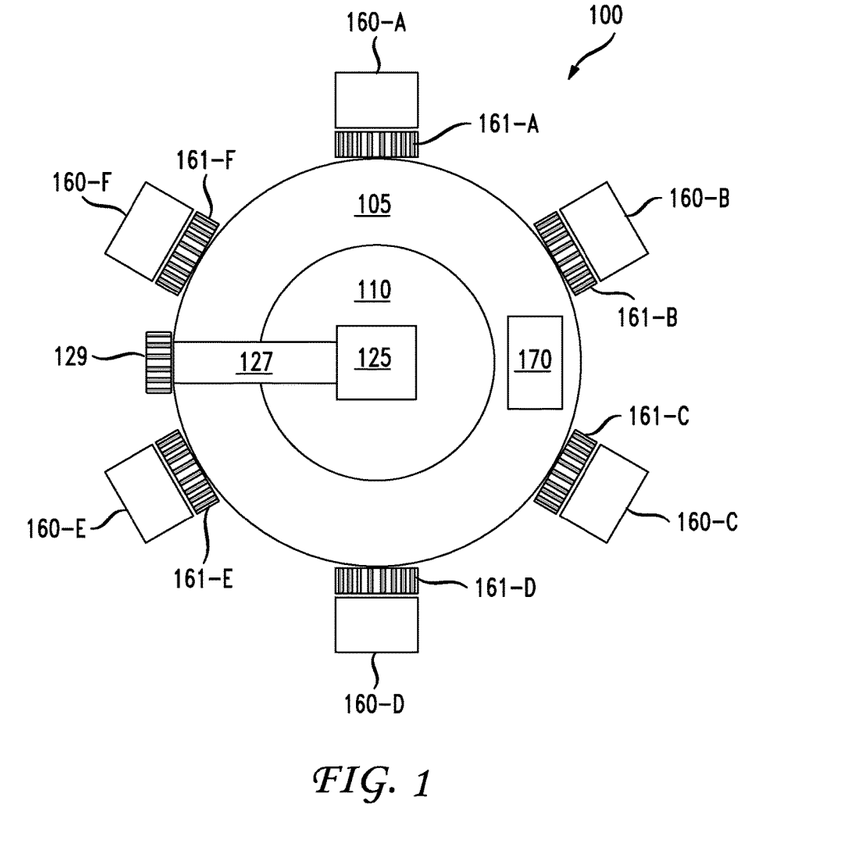
FIG. 1 shows a top view of a circular carousel system in accordance with an embodiment.

FIG. 1 shows a top view of a carousel system in accordance with an embodiment. Carousel system 100 comprises a platform 105 and a circular carousel 110 rotatably mounted on platform 105. A drive motor 125 is mounted on carousel 110. A drive shaft 127 extends from drive motor 125. A drive gear 129 is mounted at the end of drive shaft 127. Drive motor 125 turns drive shaft 127 and drive gear 129.

A plurality of delivery systems are mounted at selected locations around the periphery of platform 105. In the illustrative embodiment, six (6) delivery systems 160-A, 160-B, 160-C, 160-D, 160-E, are 160-F are shown; however, in other embodiments, any number of delivery systems may be used. For example, in various other embodiments, a carousel system may include two, three, four, five, seven, eight, nine, ten or more delivery systems mounted in a manner similar to that shown in FIG. 1.

In the illustrative embodiment, delivery systems 160 are mounted symmetrically around the periphery of platform 105. In other embodiments, delivery systems may be mounted around the periphery of a carousel system in a non-symmetrical arrangement.

Each delivery system 160 includes a corresponding activation gear 161. Specifically, delivery system 160-A comprises activation gear 161-A, delivery system 160-B comprises an activation gear 161-B, delivery system 160-C comprises activation gear 161-C, delivery system 160-D comprises an activation gear 161-D, delivery system 160-E comprises activation gear 161-E, and delivery system 160-F comprises an activation gear 161-F.

Figure 2:
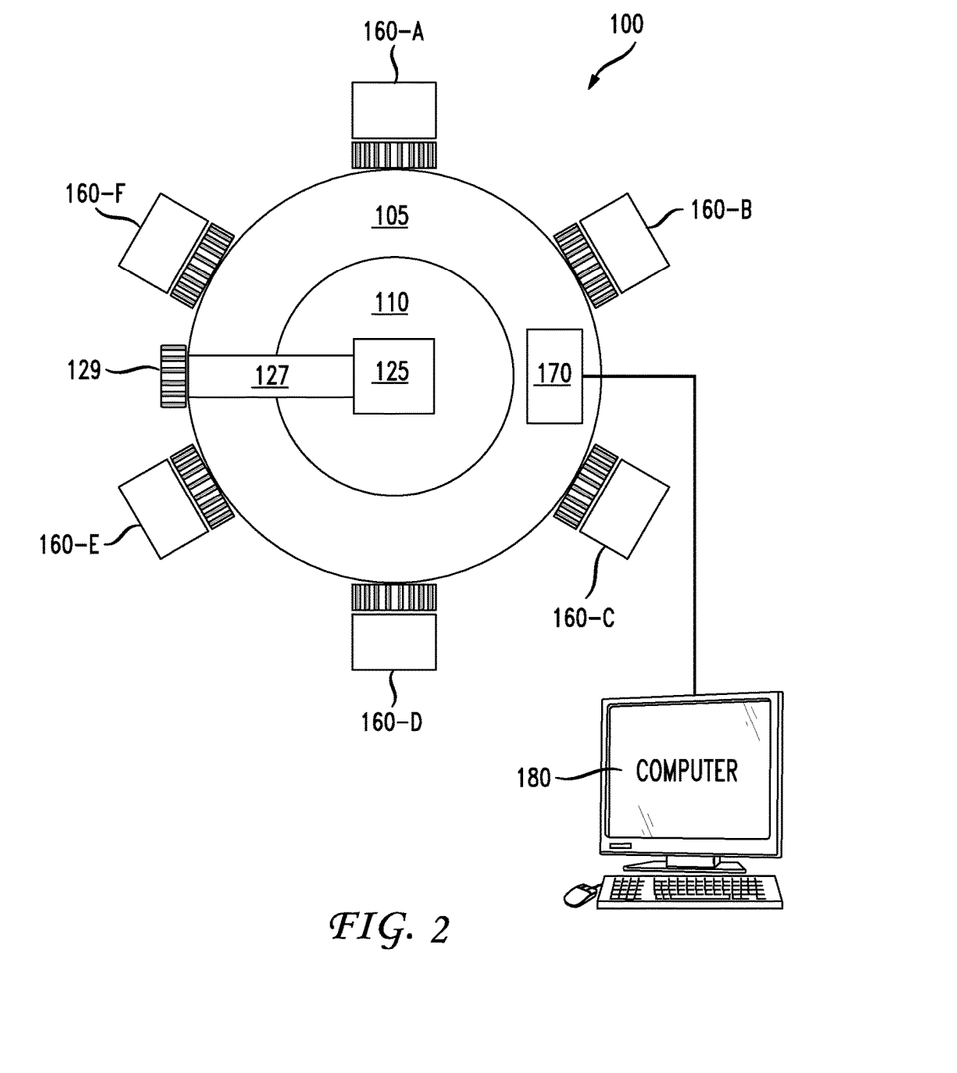
FIG. 2 shows a top view of a circular carousel system in accordance with an embodiment.

Carousel system 100 also comprises a carousel motor 170, which is mounted on platform 105 in the illustrative embodiment of FIG. 1. Carousel motor 170 is coupled to carousel 110 and from time causes carousel to rotate to a desired orientation. For example, carousel motor 170 may be coupled to carousel 110 by one or more gears. Carousel motor 170 rotates carousel 110 in response to control signals received from a computer or other device. For example, in an illustrative embodiment shown in FIG. 2, carousel motor 170 is coupled to a computer 180. In other embodiments, carousel motor 170 may receive control signals from another source; for example, carousel motor 170 may receive control signals wirelessly, either from a local or remote processor.

Alternatively, carousel motor 170 may comprise a processor that generates control signals for turning carousel 110. Alternatively, carousel motor 170 may receive control signals from a source accessible via the Internet.

Figure 3:
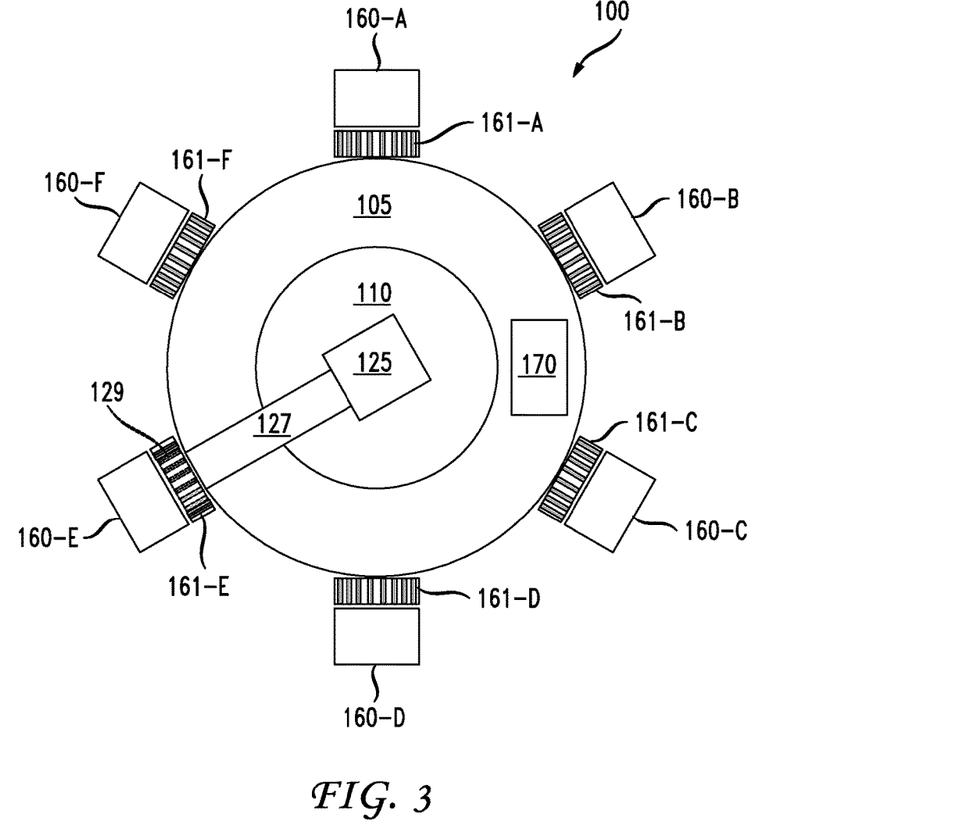
FIG. 3 shows a top view of a circular carousel system in accordance with an embodiment.

Accordingly, carousel motor 170 may cause carousel 110 to rotate from a first position (shown in FIGS. 1 and 2) to a second position in which drive gear 129 is engaged with the activation gear 161 of a selected delivery system 160. For example, carousel motor 170 may cause carousel 110 to turn from the first position (shown in FIGS. 1 and 2) to a second position in which drive gear 129 is engaged with activation gear 161-E of delivery system 160-E, as shown in FIG. 3.

In accordance with an embodiment, in order for carousel motor 170 to rotate carousel 110 from a first position to a second position where it may engage a particular activation gear 161 to activate a particular material delivery system 160, it is sometimes necessary for carousel 110 to cause drive gear 129 to pass above a second activation gear 161 without activating the associated material delivery system 160. In order to accomplish this, as carousel 110 rotates and drive shaft 127 passes above the second activation gear 161, drive motor 125 causes drive gear 129 to turn at a rate that enables the teeth of drive gear 129 to engage with the teeth of the second activation gear 161 while causing little or no rotation of the second activation gear 161.

Figure 4:
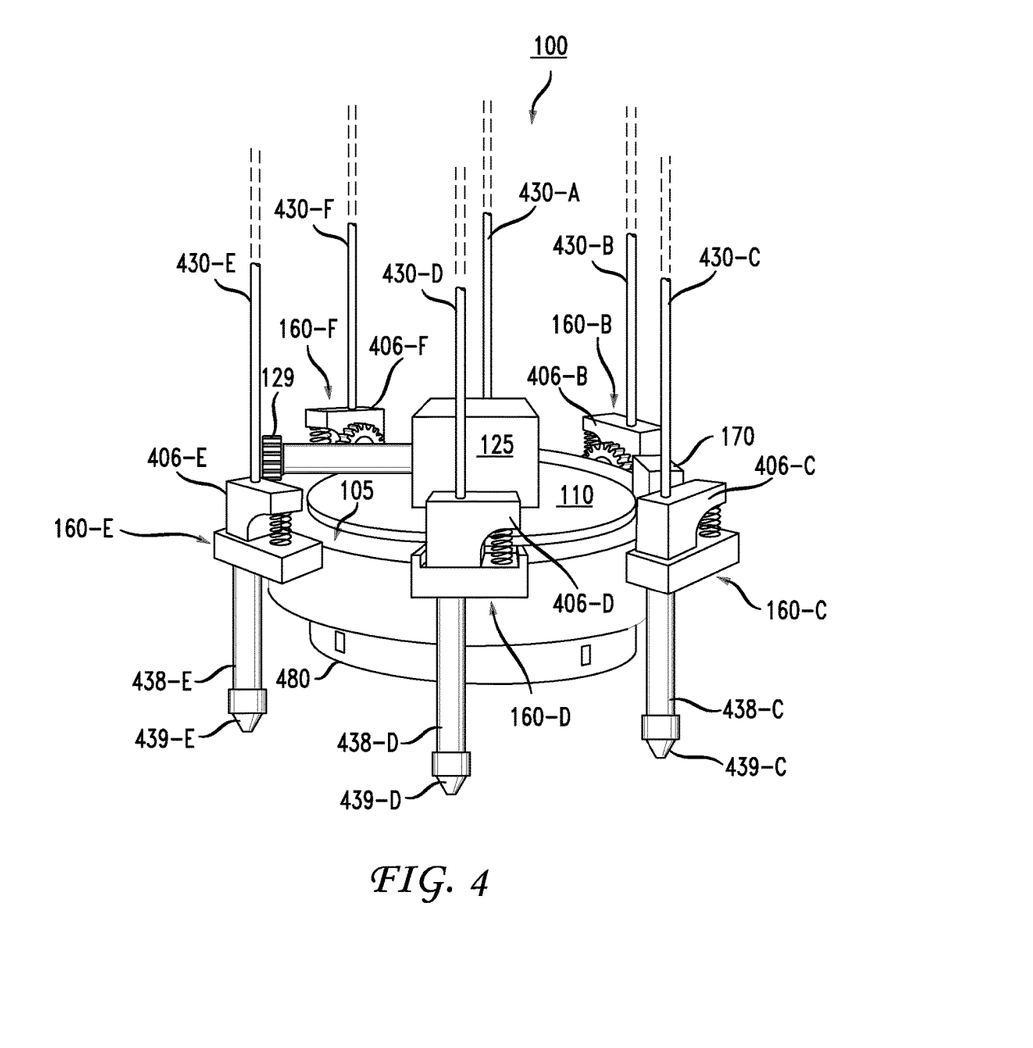
FIG. 4 shows a perspective view of a circular carousel system in accordance with an embodiment.

FIG. 4 shows a perspective view of carousel system 100. Each delivery system 160 includes a tensioner 406 and an extruder 438. Each extruder 438 includes an extruder nozzle head 439. Thus, in the illustrative embodiment shown in FIG. 4, extruder 438-C comprises an extruder nozzle head 439-C, extruder 438-D comprises an extruder nozzle head 439-D, and extruder 438-E comprises an extruder nozzle head 439-E.

A plurality of filaments 430 are engaged with tensioners 406. In the illustrative embodiment, a filament 430-A is engaged with a tensioner 406-A (not visible), a filament 430-B is engaged with a tensioner 406-B, a filament 430-C is engaged with a tensioner 406-C, a filament 430-D is engaged with a tensioner 406-D, a filament 430-E is engaged with a tensioner 406-E, and a filament 430-F is engaged with a tensioner 406-F.

A respective tensioner 406, when activated by drive gear 129, pulls the corresponding filament 430 down and forces the filament into the corresponding extruder 438. The material of the filament passes down through the extruder and enters extruder nozzle head 439. The nozzle head is heated, causing the material of the filament to soften. The softened material is then deposited onto a selected location on the build space.

In the illustrative embodiment, each filament is associated with a different color. Accordingly, by rotating carousel 110 to selectively activate various tensioners 406, material from various filaments may be applied to build an object having various layers or portions of different colors.

As shown in FIG. 4, carousel system 100 also comprises a fan cover 480 which encloses a fan (not shown in FIG. 4). The fan is used to cool one or more nozzle heads after use.

While the illustrative embodiment shown in FIGS. 1-4 includes a carousel system with a drive motor (125) and a horizontal drive shaft (127) coupled to a drive gear (129), in other embodiments, other configurations may be used. For example, in another embodiment, a vertical drive shaft is used. In another embodiment, a bevel gear may be used.

In accordance with an embodiment, carousel system 100 is used in a 3D printer system. Carousel system 100 may be mounted in any suitable manner to enable material to be deposited onto a surface for the purpose of building a desired object. For example, in various embodiments, carousel system 100 may be mounted in a manner that provides one, two, or three degrees of freedom and thus allows carousel system 100 to move in various directions. In another embodiment, carousel system 100 may be mounted in a fixed position. In such an embodiment, carousel 110 may rotate, and the bed on which an object is built may move in various directions.

Figure 5:
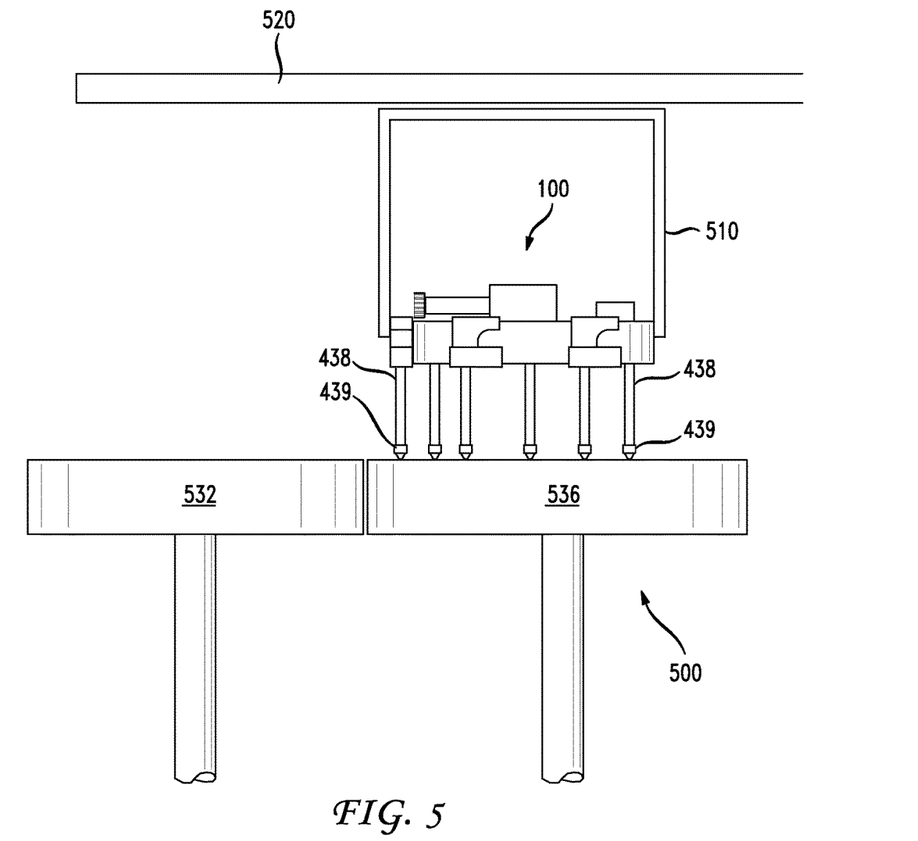
FIG. 5 shows a 3D printer system that includes a circular carousel system and a movable bed in accordance with an embodiment.

FIG. 5 shows a 3D printer system 500 in accordance with an embodiment. FIG. 5 is illustrative only and is not to be construed as limiting. 3D printer system 500 comprises carousel system 100, a rack 510, and a track system 520. Specifically, carousel system 100 is mounted on rack 510, which in turn is mounted on track system 520. Rack 510 may move along an x-axis and along a y-axis within track system 520, providing one or two degrees of freedom.

3D printer system 500 further includes a bed 536 on which an object is built. 3D printer system 500 also includes a drip surface 532.

Figure 6:
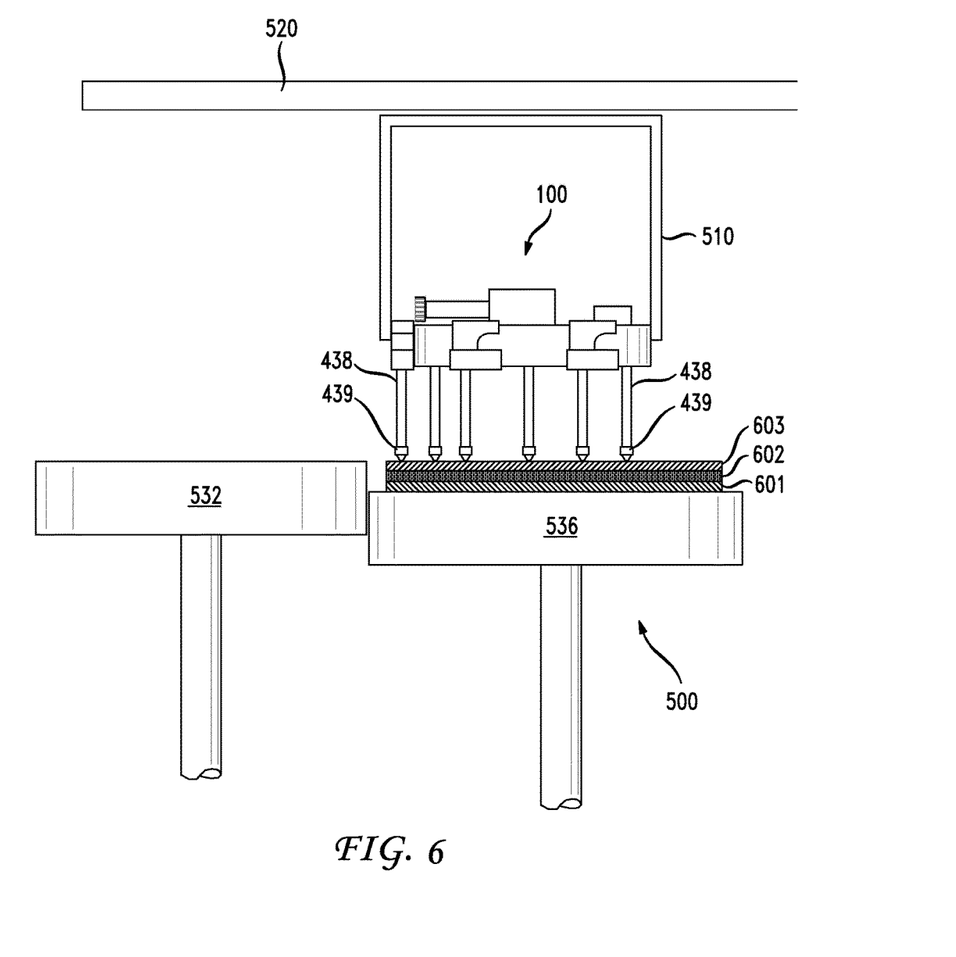
FIG. 6 shows a 3D printer system that includes a circular carousel system and a movable bed in accordance with an embodiment.

In an illustrative embodiment, 3D printer system 500 uses extruders 438 (of carousel system 100) to deposit one or more layers of material onto bed 536. Referring to FIG. 6, for example, material layers 601, 602, 603 have been deposited onto bed 536.

In accordance with an embodiment, the height of bed 536 is adjusted during construction of an object. However, drip surface 532 remains stationary; accordingly, the height of drip surface 532 does not change. Thus, as layers of material are deposited onto bed 536, the height of bed 536 is lowered, such that the surface of the top layer of material is level with the surface of drip surface 532. In the illustrative embodiment of FIG. 6, the height of bed 536 has been lowered as layers 601, 602, and 603 were deposited. Consequently, bed 536 is at a lower level than drip surface 532. However, the top surface of layer 603 is level with the surface of drip surface 532.

Figure 7:
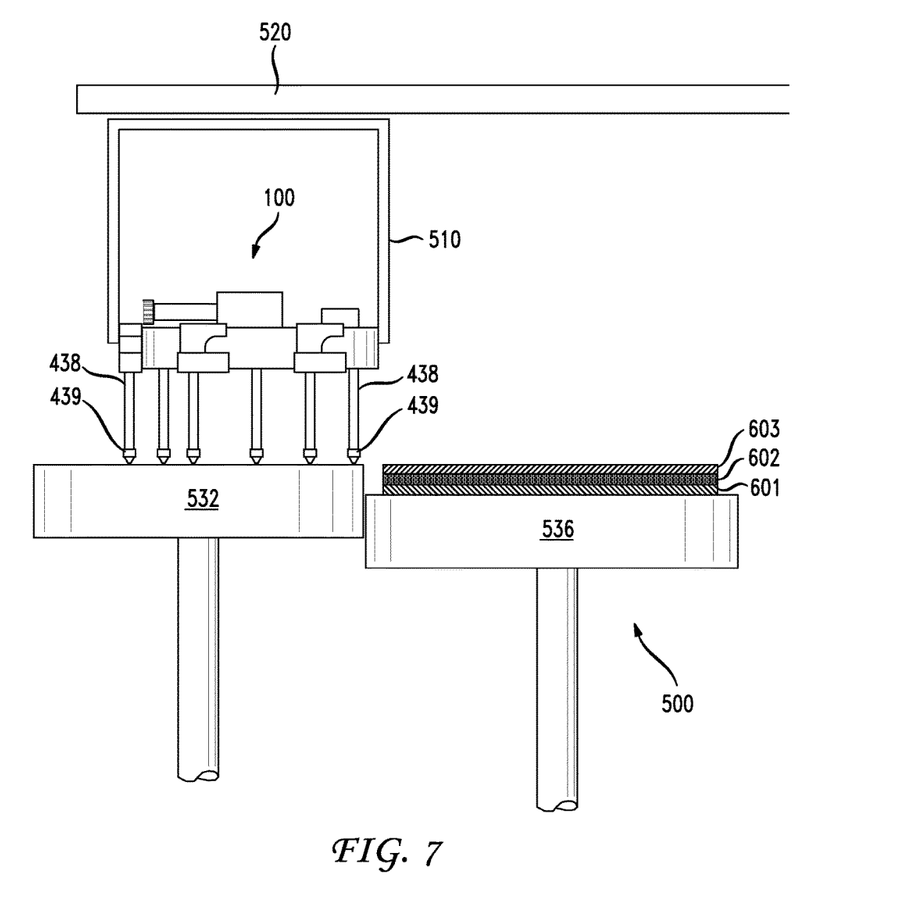
FIG. 7 shows a 3D printer system that includes a circular carousel system and a movable bed in accordance with an embodiment.

In accordance with another embodiment, after use of a first extruder nozzle head 439, and before use of a second extruder nozzle head 439, carousel system 100 is moved from a first position above bed 536 to a second position above drip surface 532. FIG. 7 shows 3D printer 500 when carousel system 100 is positioned above drip surface 532. When carousel system 100 is positioned above drip surface 532, carousel system 100 moves in a manner to cause one or more of extruder nozzle heads 439 to be wiped clean. For example, in one embodiment, a nozzle head that has just been used is wiped clean. In another embodiment, all nozzle heads 439 may be wiped clean.

In another embodiment, when carousel system 100 is positioned above drip surface 532, an extruder nozzle head 439 that is to be used is selected, and a test line is deposited on the surface of drip surface 532 using the selected nozzle head.

Figure 8A:
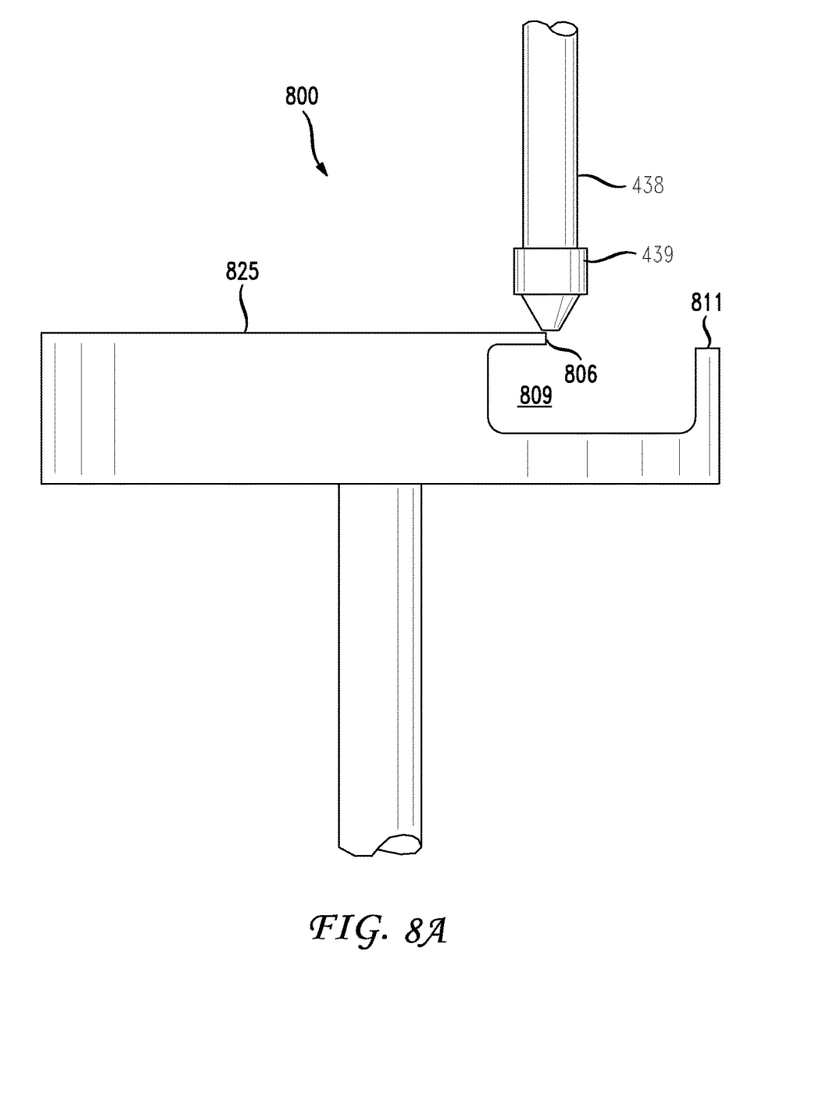
FIG. 8A shows a drip surface in accordance with an embodiment.

FIG. 8A illustrates a drip surface in accordance with another embodiment. Drip surface 800 comprises a surface 825, a cavity 809, and a sidewall 811. A lip 806 is joined to surface 825 and protrudes horizontally over cavity 809. The height of sidewall 811 is lower than the height of surface 825.

In accordance with an embodiment, carousel system 100 may be moved horizontally, from a bed on which an object is being constructed, over sidewall 811 and cavity 809, and onto surface 825. When an extruder nozzle head 439 passes over lip 806, the nozzle head is wiped clean at the leading edge of lip 806, and any excess material removed from the nozzle head falls into cavity 809. Surface 825 may be used, for example, to deposit a test line using a selected extruder nozzle head.

Figure 8B:
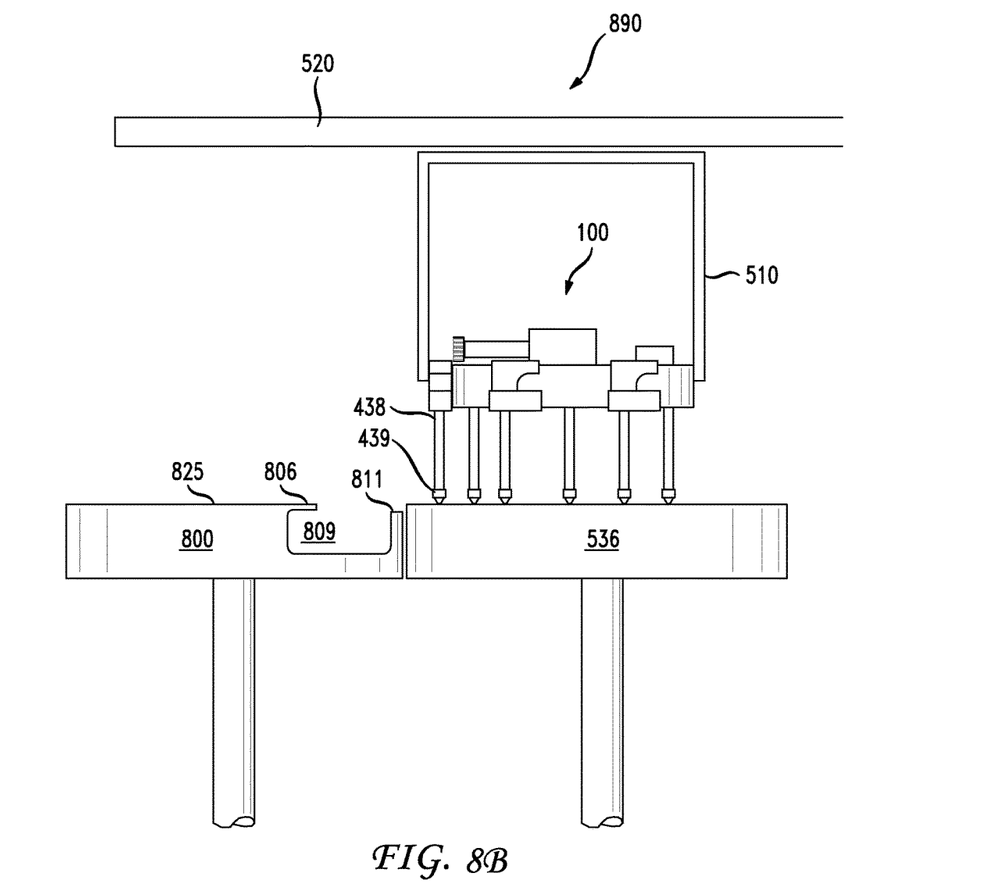
FIG. 8B shows a 3D printer system that includes a circular carousel system, a movable bed, and a drip surface in accordance with an embodiment.

Drip surface 800 may be used with a movable bed similar to that shown in FIGS. 5-7. FIG. 8B shows a 3D printer system 890 in accordance with an embodiment. 3D printer system 890 comprises carousel system 100 mounted in rack 510, and track system 520. 3D printer system 890 also includes movable bed 536 and drip surface 800 (which includes cavity 809 and lip 806). As described above, as carousel system 100 is moved horizontally over drip surface 800, excess material is wiped from each nozzle head 439 and falls into cavity 809. As described above, carousel system 100 may be moved to a position above surface 825, and a selected extruder nozzle head may be used to deposit a test line.

Figure 9:
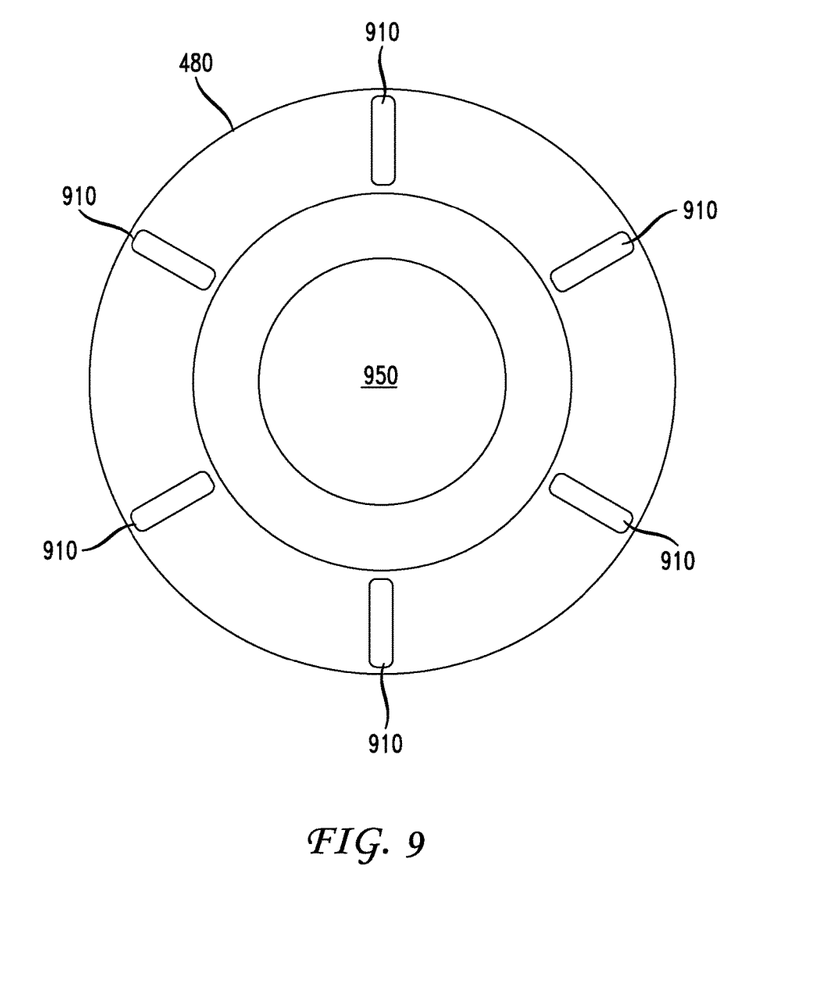
FIG. 9 shows a fan and a fan cover in accordance with an embodiment.

FIG. 9 shows a fan and fan cover in accordance with an embodiment. As illustrated in FIG. 4, fan cover 480 is positioned underneath carousel system 100. A fan 950 is similarly disposed underneath carousel system 100 and operates to cool one or more selected nozzle heads after the nozzle head(s) have been used. In the illustrative embodiment, fan 950 is enclosed by fan cover 480. Fan cover 480 comprises a plurality of slots 910 equal in number to, and corresponding to, the extruder nozzle heads 439. Thus, in the illustrative embodiment, carousel system 100 comprises six (6) nozzle heads 439, and accordingly fan cover 480 comprises six (6) slots 910. Each slot 910 is positioned proximate to a corresponding nozzle head and is adapted to direct a flow of air produced by fan 950 toward the corresponding nozzle head 439. In other embodiments, a carousel system may have a different number of nozzle heads and a correspondingly different number of slots in the fan cover.

In the illustrative embodiment, fan 950 is enclosed within fan cover 480 and produces a flow of air directed downward to the bottom of fan cover 480. The flow of air contacts the bottom of fan cover 480 and is redirected and redistributed horizontally and evenly in all directions.

Thus, in the illustrative embodiment, when fan 950 is operating, each slot 910 produces a flow of air directed toward the corresponding nozzle head. In other embodiments, fan cover 480 may include a mechanism to direct the flow of air produced by fan 950 toward a single selected nozzle head.

In accordance with another embodiment, a method of operating a circular carousel system is provided. In an illustrative embodiment, suppose that 3D printer system 500 (shown in FIG. 5) is being used to construct a desired object. Suppose further that each extruder nozzle head 439 of carousel system 100 provides a different color of material. Thus, six (6) different colors are available. Suppose also that carousel motor 170 is controlled by a computer such as computer 180 shown in FIG. 2.

Figure 10:
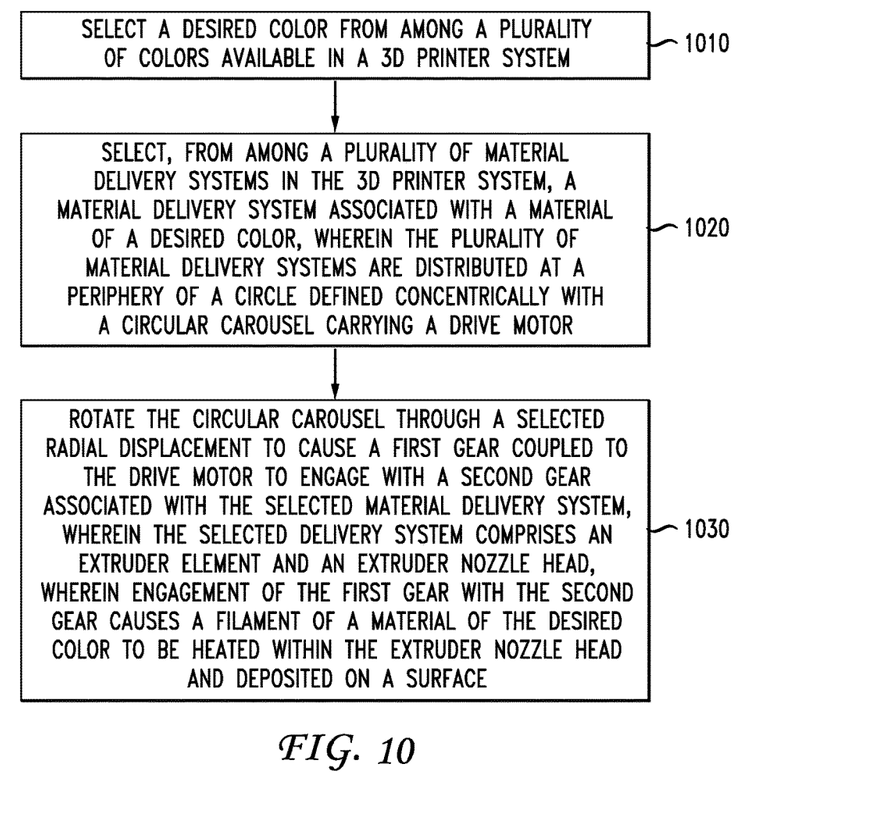
FIG. 10 is a flowchart of a method of operating a circular carousel in accordance with an embodiment.

FIG. 10 is a flowchart of a method of operating a circular carousel system in accordance with an embodiment. At step 1010, a desired color is selected from among a plurality of colors available in a 3D printer system. Computer 180 thus determines at a particular stage in the construction that a particular color is required.

At step 1020, a material delivery system associated with a material of a desired color is selected, from among a plurality of material delivery systems in the 3D printer system, wherein the plurality of material delivery systems are distributed at a periphery of a circle defined concentrically with a circular carousel carrying a drive motor. Suppose, in the illustrative embodiment, that computer 180 determines that extruder nozzle head 160-C produces the particular desired color.

At step 1030, the circular carousel is rotated through a selected radial displacement to cause a first gear coupled to the drive motor to engage with a second gear associated with the selected material delivery system, wherein the selected material delivery system comprises an extruder element and an extruder nozzle head, wherein engagement of the first gear with the second gear causes a filament of a material of the desired color to be heated within the extruder nozzle head and deposited on a surface. Thus, computer 180 directs carousel motor 170 to cause carousel 110 to rotate from a first radial position to a second radial position at which drive gear 129 may engage with activation gear 161-C (of material delivery system 160-C). Drive motor 125 may then cause drive gear 129 to activate delivery system 160-C, which then deposits the material of the desired color onto the bed.

Figure 11:
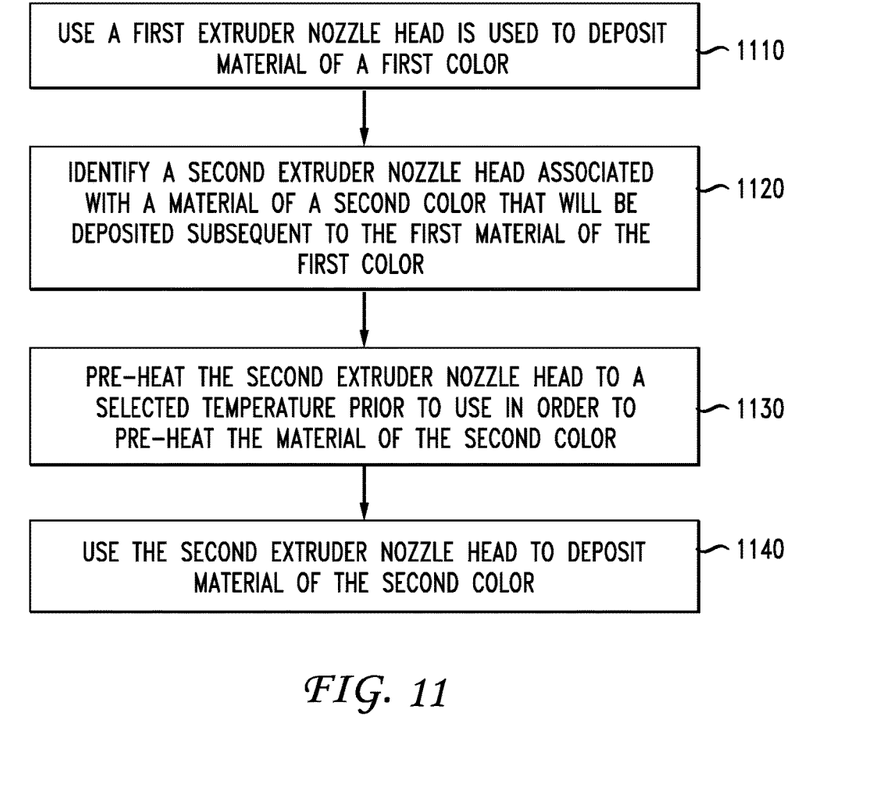
FIG. 11 is a flowchart of a method of pre-heating an extruder nozzle head in accordance with an embodiment.

In accordance with another embodiment, a selected extruder nozzle head is pre-heated prior to use. FIG. 11 is a flowchart of a method of pre-heating an extruder nozzle head in accordance with an embodiment. At step 1110, a first extruder nozzle head is used to deposit material of a first color. Suppose, for example, that extruder nozzle head 439-E is used to deposit material of a first color.

At step 1120, a second extruder nozzle head associated with a material of a second color that will be deposited subsequent to the first material of the first color is identified. Thus, for example, computer 180 may determine that after nozzle head 439-E is used, it will be necessary to use extruder nozzle head 439-D to deposit material of a second color.

At step 1130, the second extruder nozzle head is pre-heated to a selected temperature prior to use in order to pre-heat the material of the second color. Thus, at a selected time prior to use of extruder nozzle head 439-E, computer 180 causes extruder nozzle head 439-E to be pre-heated to a selected temperature (less than the temperature that melts the material, to avoid dripping).

At step 1140, the second extruder nozzle head is used to deposit material of the second color. Computer 180 then causes carousel system 100 to activate tensioner 160-E, causing extruder nozzle head 439-E to deposit material of the second color onto the build surface.

Thus, in accordance with an embodiment, a carousel system includes a platform, and a plurality of material delivery systems mounted on a periphery of the platform, each respective material delivery system including a first gear and an extruder nozzle head. The carousel system also includes a carousel rotatably mounted on the platform, a first motor adapted to cause the carousel to rotate from a first radial position to a second radial position, a second motor mounted on the carousel, a drive shaft coupled to the second motor, and a second gear coupled to the drive shaft, the second gear adapted to engage with a selected one of the first gears. Engagement of the second gear with a selected one of the first gears causes the corresponding material delivery system to force an amount of a selected material into the corresponding extruder nozzle head, heat the amount of the selected material within the extruder nozzle head to soften the selected material, and deposit the amount of the selected material on a surface.

In one embodiment, the carousel has a circular shape. In other embodiments, the plurality of material delivery systems includes two, three, four, five, six, or more material delivery systems, each material delivery system being associated with a respective material having a respective color.

The material delivery systems may be mounted symmetrically around the periphery of the platform.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A carousel system comprising:
    a platform;
    a plurality of material delivery systems mounted on a periphery of the platform, each respective material delivery system comprising a first gear and an extruder nozzle head;
    a carousel rotatably mounted on the platform;
    a first motor adapted to cause the carousel to rotate from a first radial position to a second radial position;
    a second motor mounted on the carousel;
    a drive shaft coupled to the second motor; and
    a second gear coupled to the drive shaft, the second gear adapted to engage with a selected one of the first gears;
    wherein engagement of the second gear with a selected one of the first gears causes the corresponding material delivery system to force an amount of a selected material into the corresponding extruder nozzle head, heat the amount of the selected material within the extruder nozzle head to soften the selected material, and deposit the amount of the selected material on a surface.

2. The carousel system of claim 1, wherein the carousel has a circular shape.

3. The carousel system of claim 2, wherein the plurality of material delivery systems comprises at least two material delivery systems, each material delivery system being associated with a respective material having a respective color.

4. The carousel system of claim 3, wherein the material delivery systems are mounted symmetrically around the periphery of the platform.

5. The carousel system of claim 1, further comprising:
    a fan; and
    a fan cover comprising a plurality of slots, each slot corresponding to a respective one of the plurality of material delivery systems.

6. A 3D printing system comprising the carousel system of claim 1.

7. The 3D printing system of claim 6, wherein the selected material comprises one of a thermoplastic filament and a metal wire.

8. The 3D printing system of claim 6, further comprising:
    a track system;
    a rack mounted on the track system, the rack being capable of movement with at least one degree of freedom within the track system;
    a bed adapted to receive at least a first layer of the selected material and a second layer of a second material; and
    a drip surface proximate the bed;
    wherein the carousel system is mounted on the rack;
    wherein the bed is further adapted to move to a lower position after the selected material is deposited on the bed, such that a first surface of the selected material is level with a second surface of the drip surface;
    wherein the carousel system is further adapted to move from a first position above the bed to a second position above the drip surface, and to move above the drip surface in a manner that causes the selected material to be wiped from the extruder nozzle head onto the drip surface.

9. The 3D printing system of claim 8, wherein the drip surface comprises:
    a cavity;
    a sidewall having a first height lower than a second height of the second surface; and
    a lip joined to the second surface and protruding horizontally over the cavity.

* * * * *